(12) United States Patent
Chen

(10) Patent No.: US 7,771,189 B2
(45) Date of Patent: Aug. 10, 2010

(54) INJECTION MOLDING APPARATUS WITH REPLACEABLE GATE INSERT

(75) Inventor: Jincheng Chen, Leawood, KS (US)

(73) Assignee: R&D Tool & Engineering Co., Lee's Summit, MO (US)

(*) Notice: Subject to any disclaimer, the term of this patent is extended or adjusted under 35 U.S.C. 154(b) by 222 days.

(21) Appl. No.: 12/041,467

(22) Filed: Mar. 3, 2008

(65) Prior Publication Data

US 2009/0220634 A1    Sep. 3, 2009

(51) Int. Cl.
*B29C 45/18* (2006.01)
(52) U.S. Cl. .................................. 425/549; 425/572
(58) Field of Classification Search .................. 425/549, 425/564, 565, 566, 572
See application file for complete search history.

(56) References Cited

U.S. PATENT DOCUMENTS

| | | | |
|---|---|---|---|
| 2,814,831 A | 12/1957 | McKee, Jr. | |
| 3,512,216 A | 5/1970 | Voelker | |
| 3,535,742 A | 10/1970 | Marcus | |
| 3,559,245 A | 2/1971 | Ryan | |
| 3,718,166 A | 2/1973 | Gordon | |
| 3,758,252 A | 9/1973 | Kohler | |
| 3,940,226 A | 2/1976 | Verhoeven | |
| 4,076,475 A | 2/1978 | Trueblood | |
| 4,299,791 A | 11/1981 | Aoki | |
| 4,416,608 A | 11/1983 | Deardurff | |
| 4,595,552 A | 6/1986 | Hahn | |
| 4,751,037 A | 6/1988 | Faneuf | |
| 4,793,795 A * | 12/1988 | Schmidt et al. | 425/549 |
| 4,810,184 A * | 3/1989 | Gellert et al. | 425/548 |
| 4,945,630 A * | 8/1990 | Gellert | 425/549 |
| 4,979,892 A * | 12/1990 | Gellert | 425/549 |
| 5,000,675 A * | 3/1991 | Gellert et al. | 425/549 |
| 5,139,724 A | 8/1992 | Hofstetter et al. | |
| 5,254,305 A | 10/1993 | Fernandez et al. | |

(Continued)

FOREIGN PATENT DOCUMENTS

JP    3875851 B    1/2007

(Continued)

OTHER PUBLICATIONS

PCT/US2006/047873 International Search Report and Written Opinion of the International Searching Authority dated Jan. 15, 2009 (13 pgs).

(Continued)

*Primary Examiner*—Tim Heitbrink
(74) *Attorney, Agent, or Firm*—Hovey Williams LLP

(57) ABSTRACT

Injection molding apparatus has upper and lower mold halves that split along the center line of the parison cavity and the gate passage leading thereto. Each hot melt injection nozzle is received within a tubular insert cup having a reduced diameter tip that is seated within the gate passage. The cup is supported on the lower mold half so as to remain thereon as the upper mold half opens and closes the mold. The base end of each nozzle has a swivel ball and socket relationship with the manifold block which supplies it with hot melt, while the tip end of each injection nozzle is configured to permit swivelling within the insert cup as need be to accommodate dimensional changes that arise during non-uniform thermal expansion and contraction of different parts of the tooling.

26 Claims, 10 Drawing Sheets

U.S. PATENT DOCUMENTS

| | | | |
|---|---|---|---|
| 5,299,928 | A | 4/1994 | Gellert |
| 5,310,332 | A | 5/1994 | Ito et al. |
| 5,443,381 | A | 8/1995 | Gellert |
| 5,518,393 | A | 5/1996 | Gessner |
| 5,522,720 | A | 6/1996 | Schad |
| 5,533,882 | A | 7/1996 | Gessner et al. |
| 5,578,329 | A | 11/1996 | Hehl |
| 5,635,227 | A | 6/1997 | Whisenhunt et al. |
| 5,695,793 | A | 12/1997 | Bauer |
| 5,716,540 | A | 2/1998 | Matiacio et al. |
| 5,879,727 | A | 3/1999 | Puri |
| 5,980,234 | A | 11/1999 | Harley |
| 6,245,278 | B1 | 6/2001 | Lausenhammer et al. |
| 6,261,084 | B1 | 7/2001 | Schmidt |
| 6,302,680 | B1 | 10/2001 | Gellert et al. |
| 6,341,954 | B1 | 1/2002 | Godwin et al. |
| 6,722,011 | B1 | 4/2004 | Bacon |
| 6,726,467 | B1 | 4/2004 | Lefebure |
| 6,780,518 | B2 | 8/2004 | Azechi et al. |
| 6,923,638 | B2 | 8/2005 | Chen |
| 7,021,924 | B2 | 4/2006 | Oyama |
| 7,163,390 | B2 | 1/2007 | Zoppas et al. |
| 2001/0001656 | A1 | 5/2001 | Hasenzahl et al. |
| 2001/0016566 | A1 | 8/2001 | Allan et al. |
| 2007/0141195 | A1 | 6/2007 | Chen |

FOREIGN PATENT DOCUMENTS

| | | | |
|---|---|---|---|
| WO | WO 01/41997 | A1 | 6/2001 |

OTHER PUBLICATIONS

PCT/US2006/047873 Preliminary Report on Patentability and Written Opinion of the International Searching Authority dated Aug. 27, 2009 (9 pgs).

PCT/US2009/030317 International Search Report and Written Opinion of the International Searching Authority dated Aug. 19, 2009 (10 pgs).

Office Action dated May 14, 2008 in U.S. Appl. No. 11/313,168, filed Dec. 20, 2005 (9 pgs.).

Office Action dated Nov. 25, 2008 in U.S. Appl. No. 11/313,168, filed Dec. 20, 2005 (6 pgs.).

Office Action dated Feb. 25, 2009 in U.S. Appl. No. 11/313,168, filed Dec. 20, 2005 (4 pgs.).

Office Action dated Sep. 4, 2009 in U.S. Appl. No. 11/313,168, filed Dec. 20, 2005 (8 pgs.).

Declaration of David A. Brunson dated Dec. 3, 2009 regarding prior art sales (2 pgs).

* cited by examiner

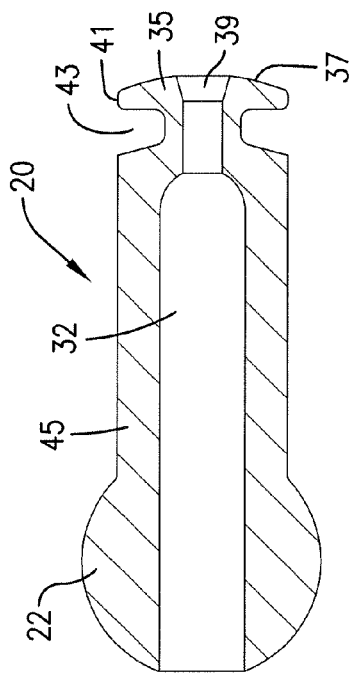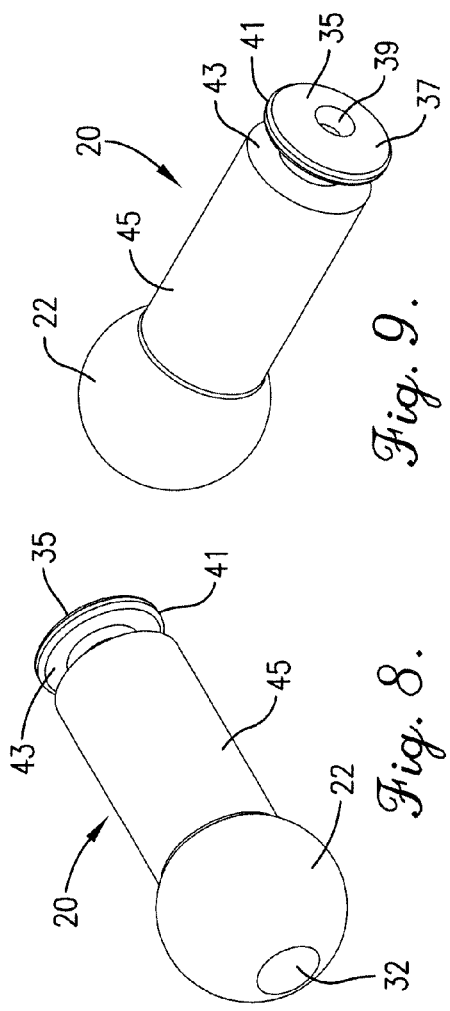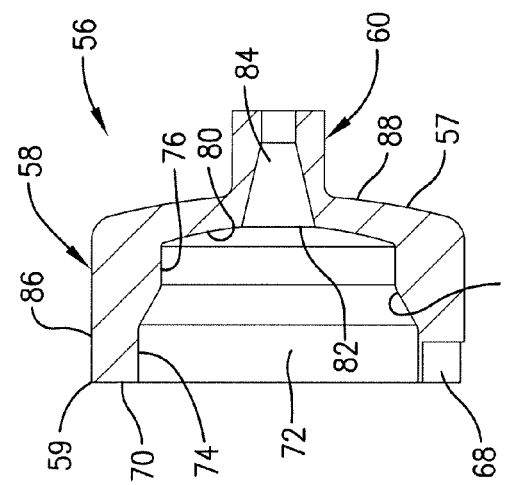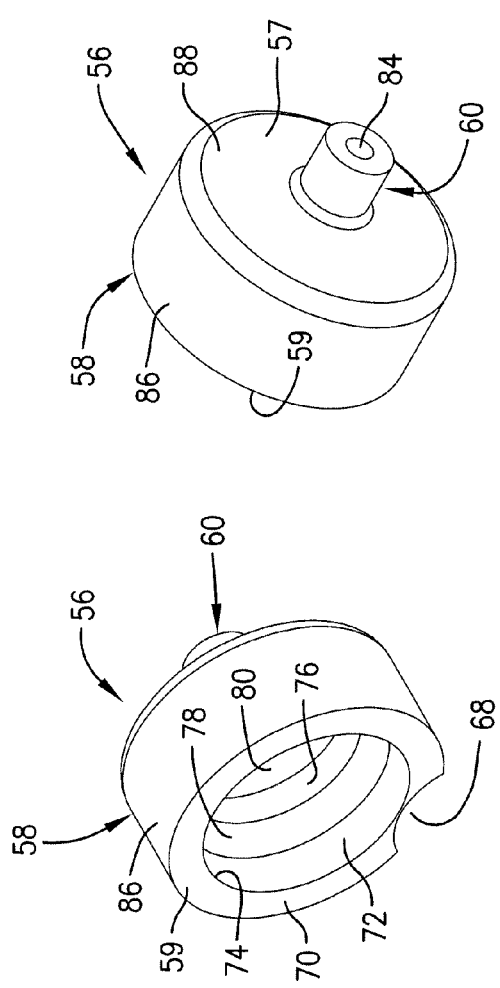

US 7,771,189 B2

INJECTION MOLDING APPARATUS WITH REPLACEABLE GATE INSERT

TECHNICAL FIELD

This invention relates to injection blow molding machines and, more particularly, to improvements in tooling for the injection molding station of such a machine.

BACKGROUND

The parison molding cavity at the injection molding station of a typical injection blow molding machine is formed in part by a pair of superimposed mold halves that split or separate along the center line of each gate opening and parison cavity. Hot melt injection nozzles have discharge tips that are seated in the gate openings. To remove a set of newly formed parisons from the mold, the upper mold halves are raised off the bottom mold halves, and the cores that carry the new parisons are then lifted and rotated out of the mold. A new set of cores is placed in the cavities of the bottom mold halves and the mold is closed, creating a diametrical sealing relationship between each nozzle tip and the wall of its gate opening and preparing the mold cavities to receive hot melt through the nozzles.

For a variety of reasons, it is difficult to maintain both the upper and lower mold halves at uniform temperatures at all times. Consequently, the upper and lower mold halves experience different degrees of expansion and contraction, and perfect alignment between upper and lower mold halves is rarely achieved. This condition is aggravated by the fact that the hot injection nozzles typically run at significantly higher temperatures than either of the mold halves.

These thermal expansion and misalignment issues inherent in split parison cavity design typically produce wear and plastic leakage at the interface between the nozzle tip and the parison cavity. The typical fix involves replacing the nozzles and repairing the gate opening region where the interface occurs.

Another problem with conventional tooling involves the start up procedure following prolonged shut down of the machine. Initially, the nozzles and the hot manifold block to which they are attached are disposed in a retracted position with the nozzles pulled back out of the mold. To begin the start up procedure, mounting bolts on a retainer block that attach each nozzle to the manifold block are intentionally loosened so that there is some slight freedom of movement of the nozzles relative to the manifold block. The manifold block and nozzles are then heated up to their operating temperature, while the mold cavities are maintained at their operating temperatures. Then, the manifold block and nozzles are pushed forward to properly seat the nozzle tips in their respective gate openings leading to the cavities. As the top mold halves are subsequently lowered against the bottom halves, the loose nozzles are engaged and realigned as need be by the lowering mold halves. Once the mold is fully closed, all of the bolts on every nozzle are retightened to secure the nozzles in their adjusted positions. Depending upon the number of mold cavities involved, this can be a laborious and time-consuming process. At shut down, the manifold and nozzles must be pulled away from the parison cavities to prevent the nozzles from binding up in the mold and/or becoming damaged as the mold halves and nozzles cool down at different rates.

There is also a problem with leakage at the base end of each nozzle and the manifold block. The repeated impact from the upper mold half during closing of the mold and effects of significant temperature differentials, as well as loosening and retightening operations of the mounting blocks for the nozzles, necessarily result in leakage problems for the rear areas of the nozzle as well as the discharge tips.

BRIEF DESCRIPTION OF THE DRAWINGS

FIG. 8 is a rear isometric view of an injection nozzle constructed in accordance with the principles of the present invention;

FIG. 9 is a front isometric view thereof;

FIG. 10 is a longitudinal cross-sectional view thereof;

FIG. 11 is a rear isometric view of an insert cup constructed in accordance with the principles of the present invention;

FIG. 12 is a front isometric view thereof;

FIG. 13 is a longitudinal cross-sectional view thereof;

DETAILED DESCRIPTION

Figure 1:
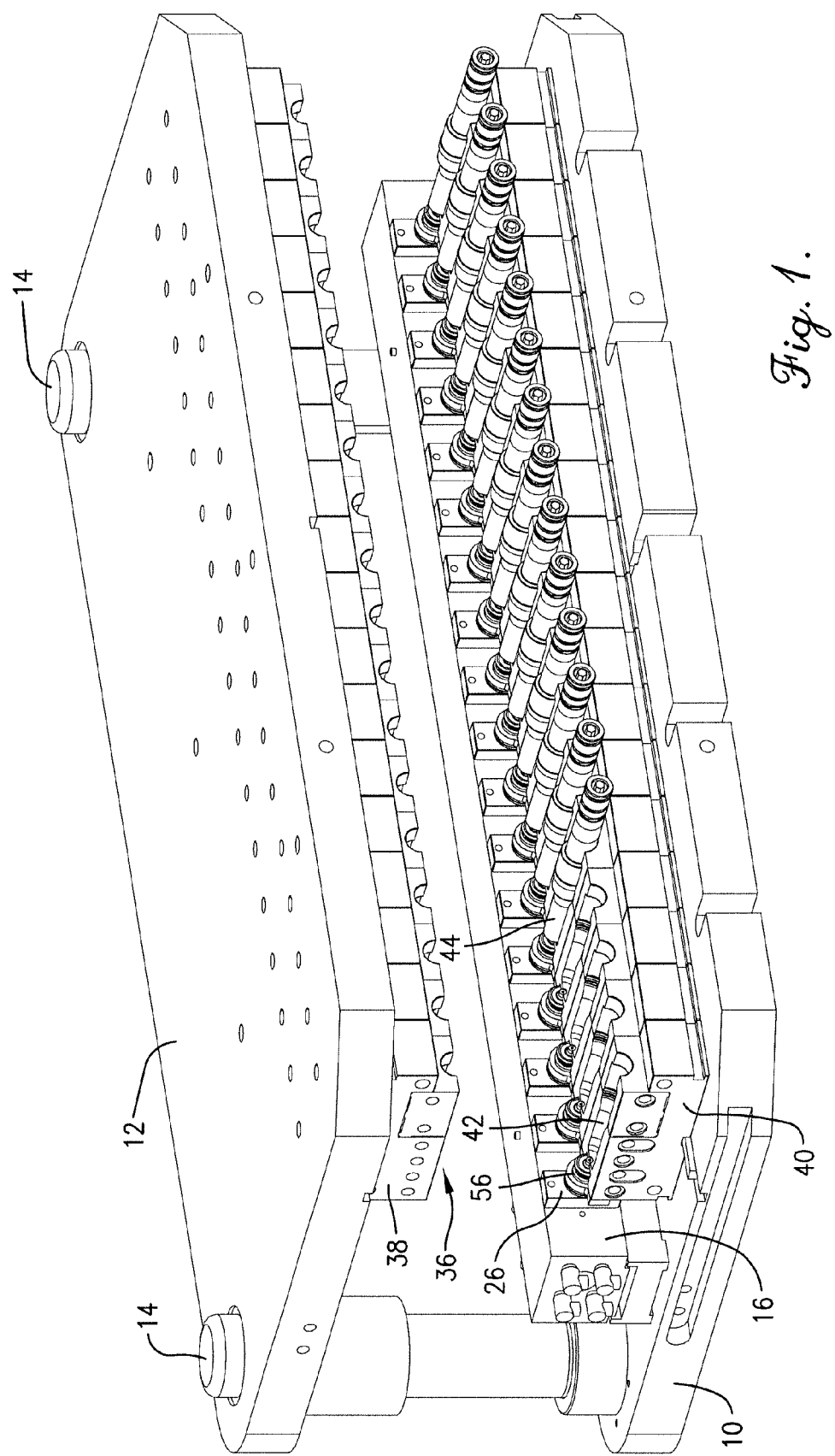
FIG. 1 is an isometric view of tooling that incorporates the principles of the present invention at the injection molding station of an injection blow molding machine, the cavity molds being illustrated in an open condition.
Figure 2:
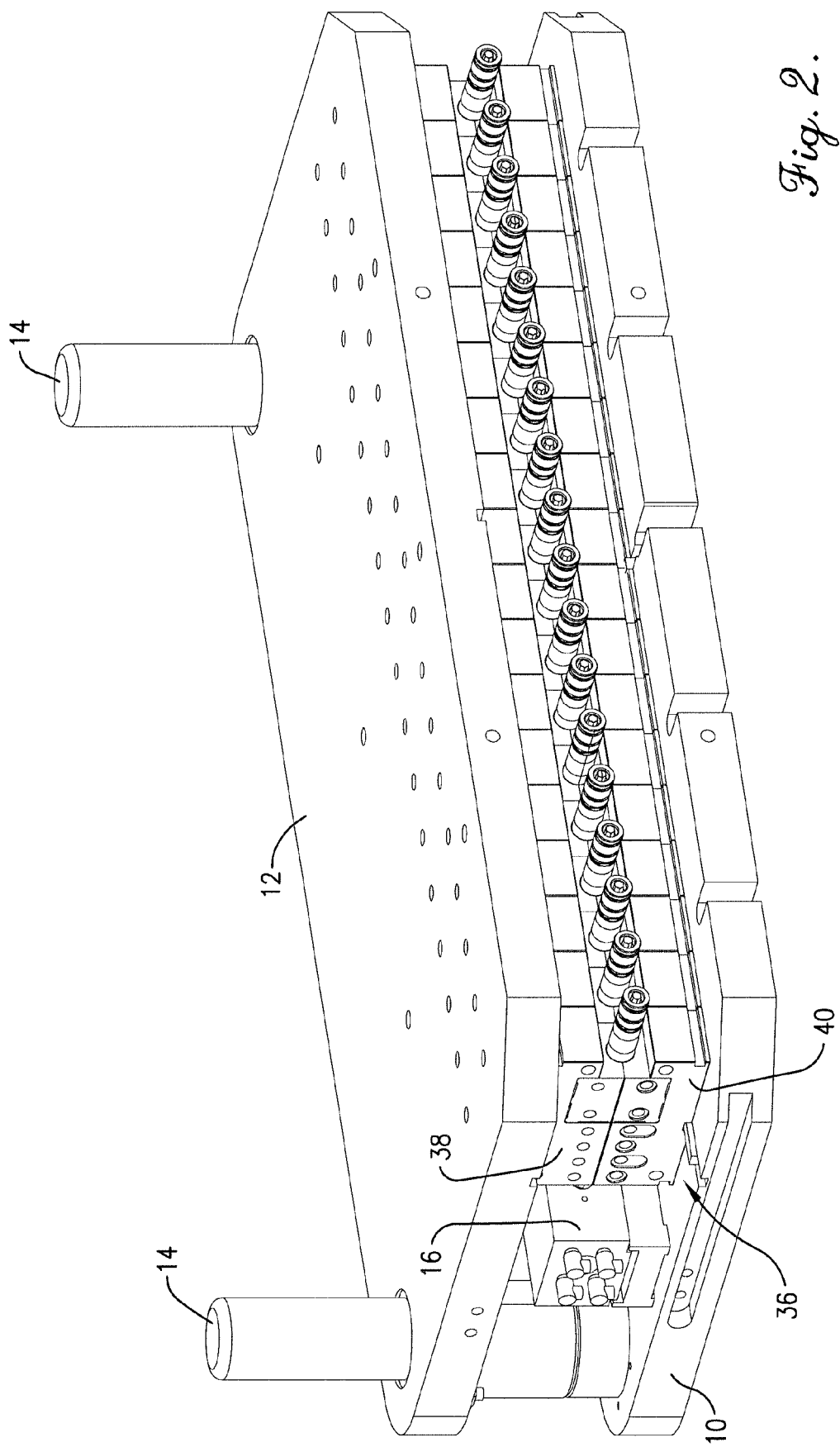
FIG. 2 is an isometric view similar to FIG. 1 with the cavity molds closed.
Figure 3:
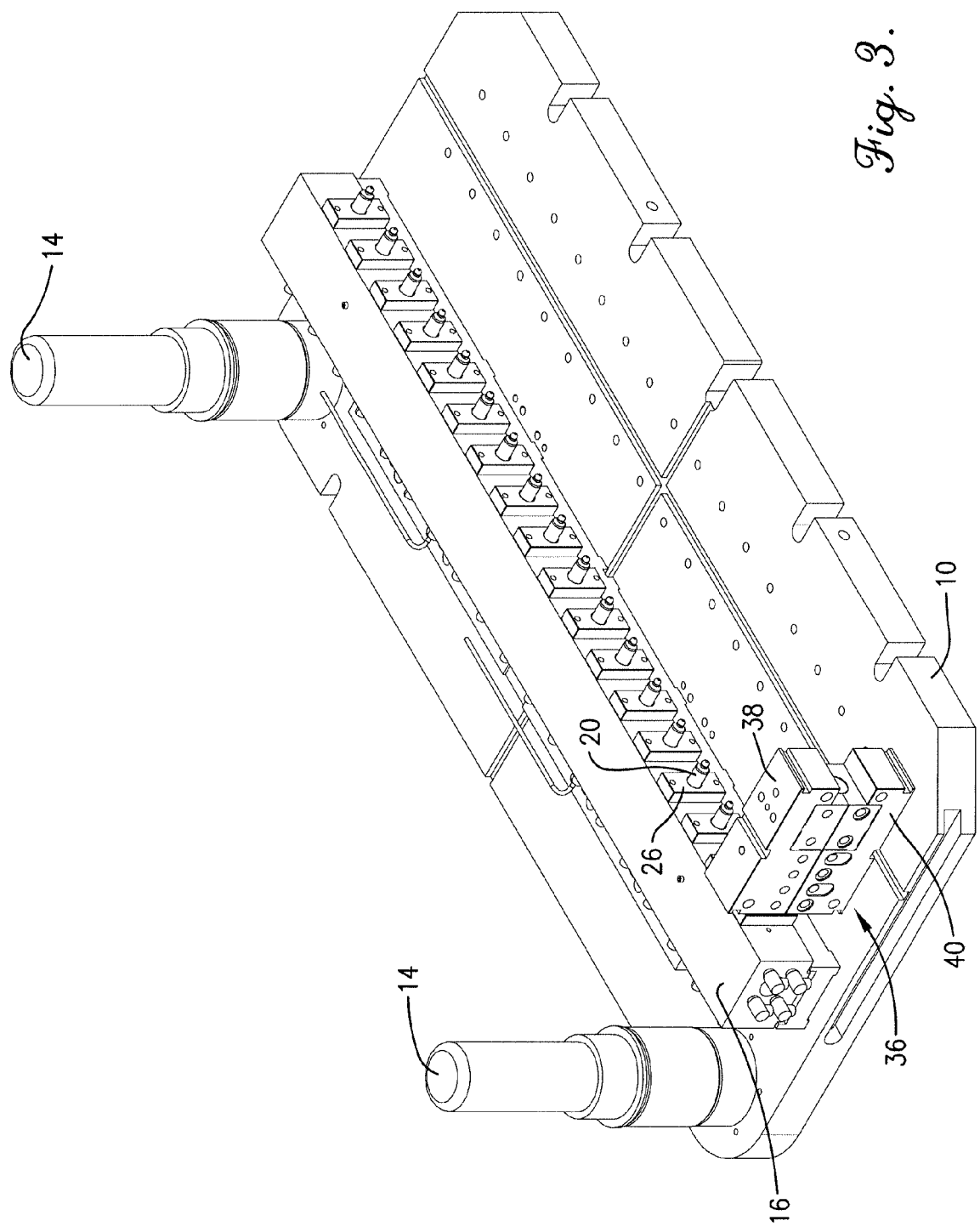
FIG. 3 is an isometric view similar to FIGS. 1 and 2 but with the top die set member and other components removed to reveal the manifold block and its injection nozzles.
Figure 4:
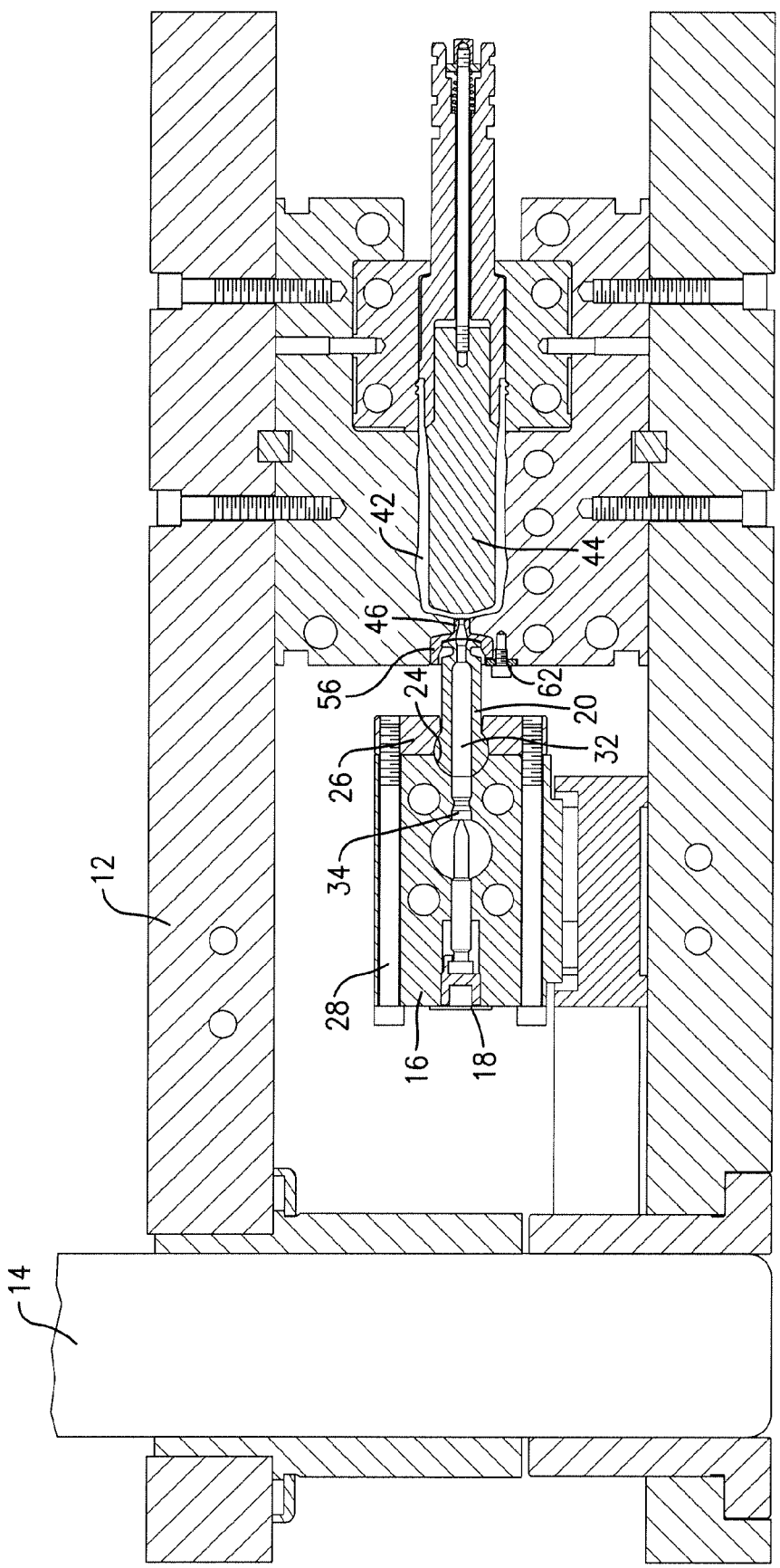
FIG. 4 is a vertical cross-sectional view through the tooling and machine components with the cavity molds closed.
Figure 5:
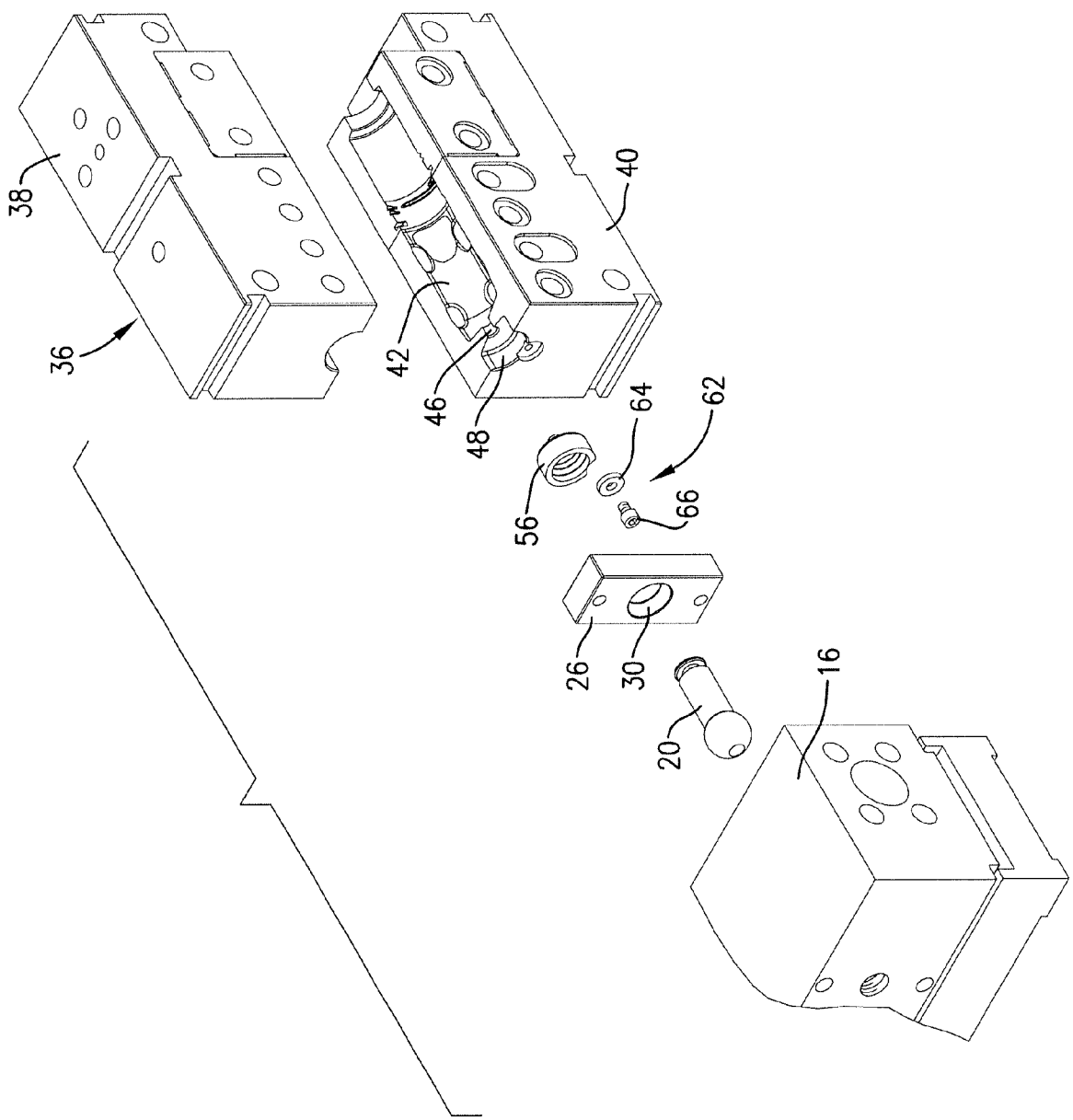
FIG. 5 is a fragmentary rear exploded view of the tooling.
Figure 6:
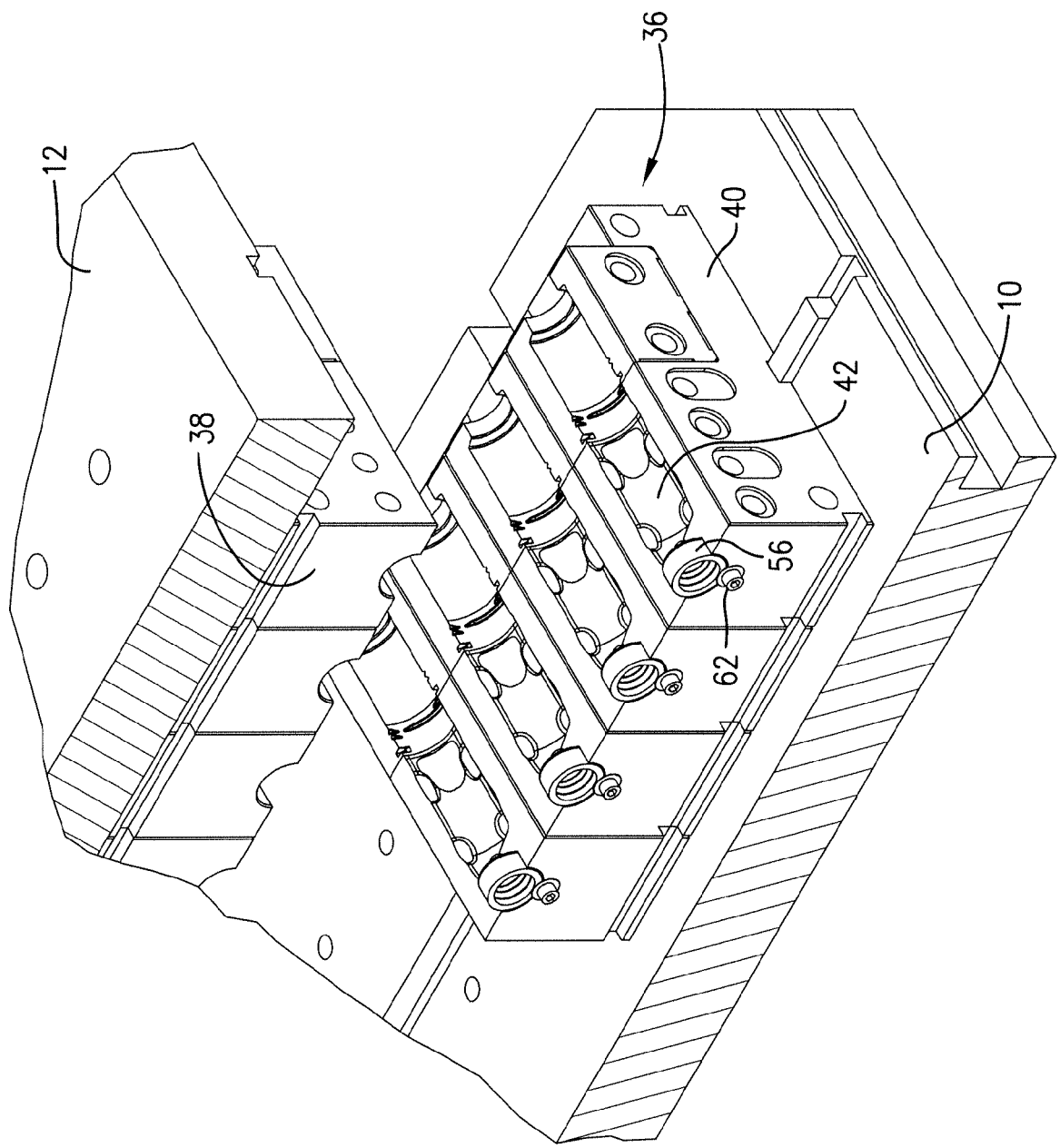
FIG. 6 is a fragmentary isometric view of the molds in an open condition illustrating how gate insert cups for receiving the injection nozzles remain with the bottom mold halves when the molds open.
Figure 7:
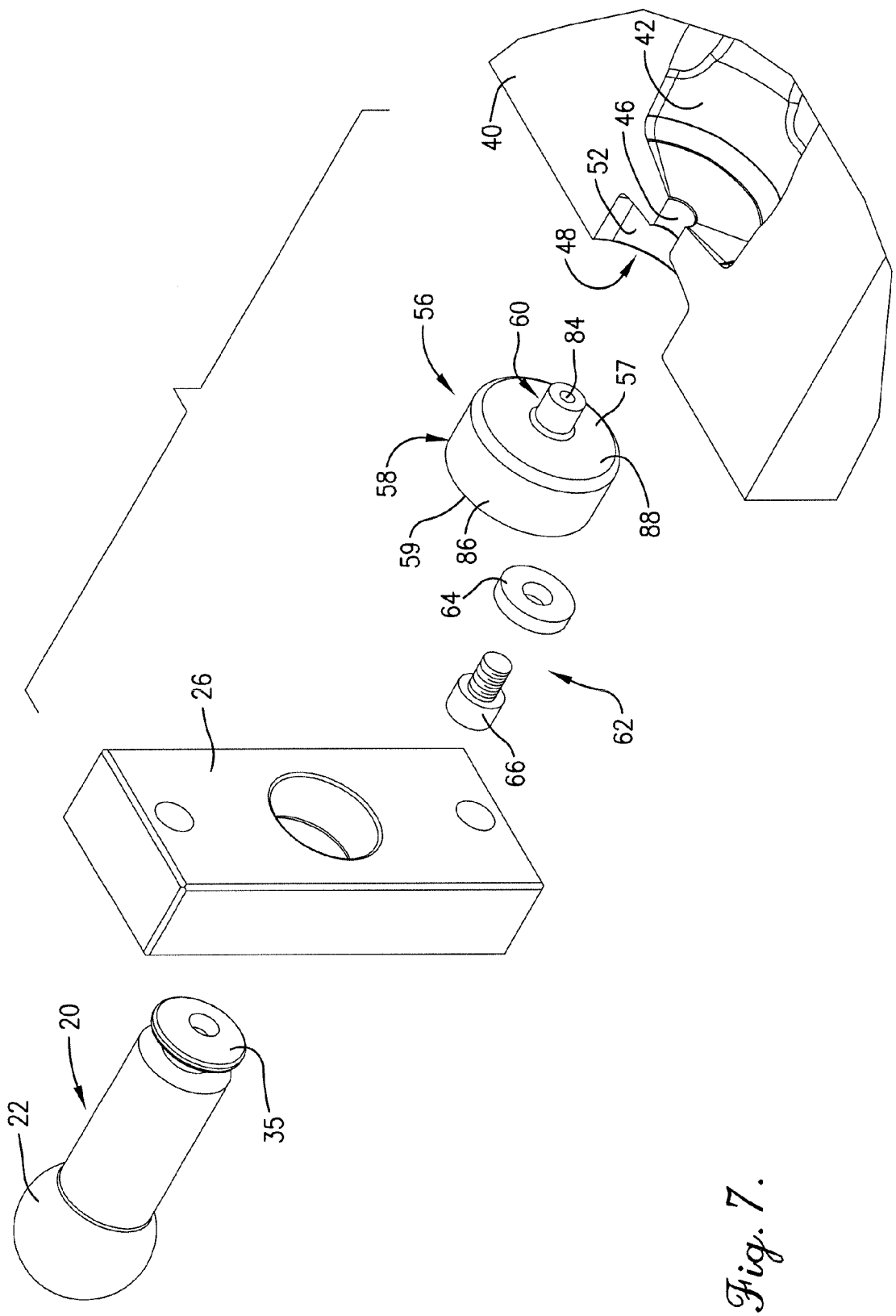
FIG. 7 is a fragmentary front exploded view of the tooling.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

FIGS. 1-4 illustrate conventional machine parts at the injection molding station of a typical injection blow molding machine, as well as tooling in accordance with the present invention. In this type of machine, the mold halves are designed to split and separate along the center line of the parison mold cavity and the gate opening leading thereto, as described more fully below.

The machine parts include a lower plate-like die set member 10 secured to the bed of the machine (not shown), and an upper plate-like die set member 12 that overlies member 10 and is moveable by means not illustrated vertically toward and away from member 10 on upright guides 14. The tooling includes an elongated manifold block 16 that is secured to lower member 10 and has an inlet sprue 18 (FIG. 4) that is disposed to receive hot molten plastic material from a source of supply (not shown). Such hot melt is directed through internal passages in manifold block 16 to a series of injection nozzles 20 that project forwardly from the front side of manifold block 16. Preferably, nozzles 20 have at their base ends a ball and socket coupling relationship with the manifold block 16 in accordance with the principles set forth in U.S. Pat. No. 6,726,467 assigned to the assignee of the present invention and hereby incorporated by reference into the present specification.

Briefly described, and with reference also to FIGS. 5-15, each nozzle 20 has a generally spherical base 22 that is received by a concave swivel seat 24 in manifold block 16. The nozzle 20 is retained in its seat by a retainer block 26 that is bolted against the front face of manifold block 16 by a pair of long bolts 28. The back side of retainer block 26 has a concave face 30 that overlies spherical base 22 of nozzle 20 so as to permit nozzle 20 to swivel to a certain extent as may become necessary during molding operations. An axially extending through passage 32 in nozzle 20 communicates with a supply passage 34 within manifold block 16 in all positions of swivelled movement of nozzle 20 to provide for the discharge of hot melt from nozzles 20 in all positions thereof. Nozzle 20 is also provided with a tip 35 at its front, discharge end.

Nozzle tip 35 has a forwardly facing end face 37 that surrounds an outlet 39 from passage 32. End face 37 slopes rearwardly away from outlet 39 as a radially outermost edge 41 of tip 35 is approached, thereby rendering end face 37 generally convex. In a preferred embodiment, end face 37 is arcuate. Preferably also, but not necessarily, the radius of curvature of end face 37 shares the same center point as the radius of curvature of spherical base 22. A continuous, circumferential groove 43 is formed in nozzle 20 between tip 35 and a main shank portion 45 of the nozzle for thermal purposes.

Manifold block 16 with its nozzles 20 is moveable horizontally toward and away from additional tooling in the form of a series of parison molds 36, each of which includes an upper mold half 38 bolted to the upper member 12 and a lower mold half 40 bolted to the lower member 10. When each mold 36 is closed, mold halves 38, 40 cooperatively form a parison cavity 42 that receives an elongated core 44 from the opposite side of the apparatus. When the manifold block 16 is in its forward operating position as illustrated throughout the figures, injection nozzles 20 are disposed for injecting hot melt into the cavities 42. When manifold 16 is backed away from its forward position, the nozzles 20 are withdrawn from between the upper and lower mold halves 38, 40.

Figure 14:
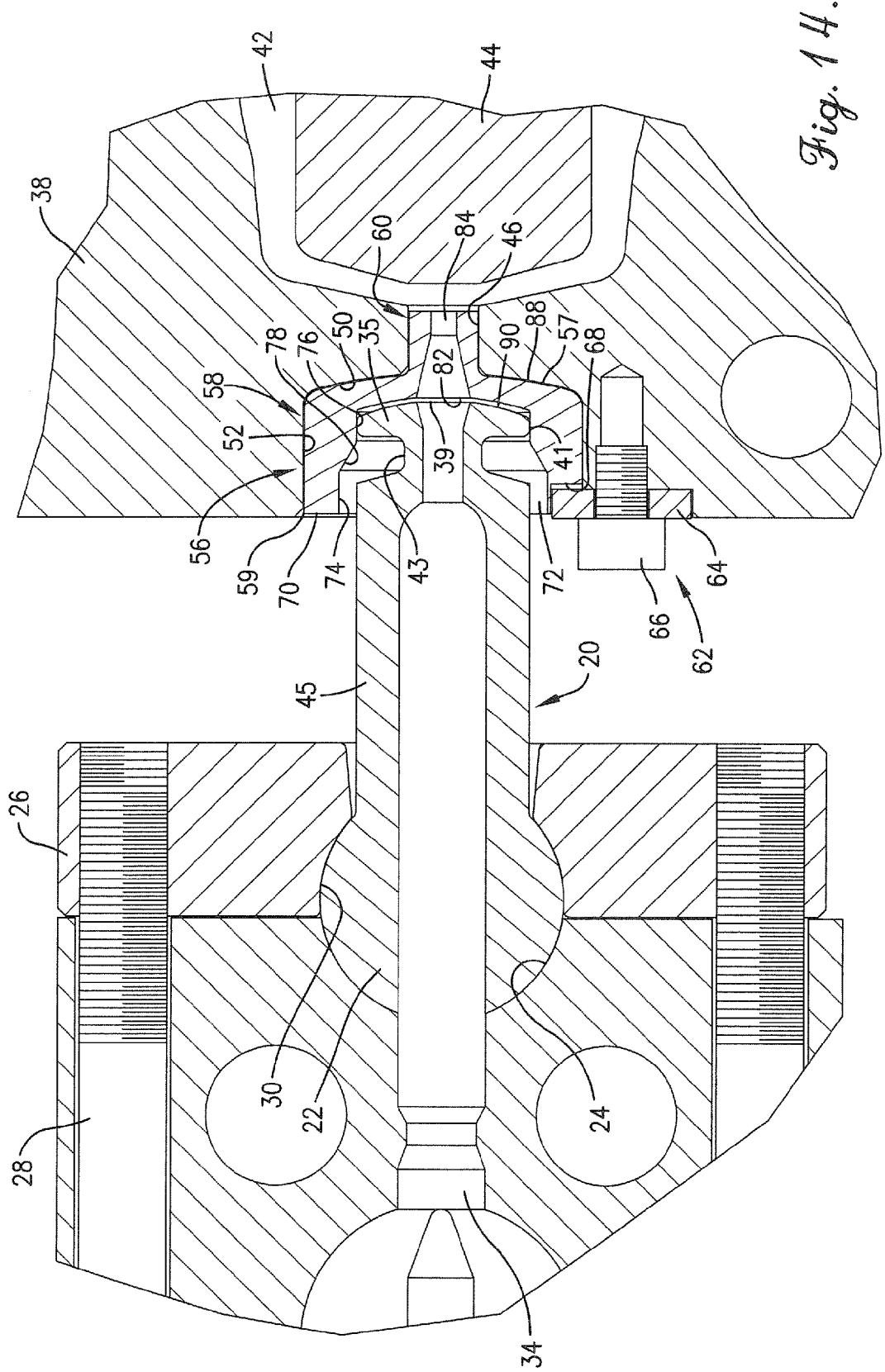
FIG. 14 is an enlarged, fragmentary vertical cross-sectional view through one cavity of the tooling with the mold closed and the injection nozzle fully inserted into the insert cup.
Figure 15:
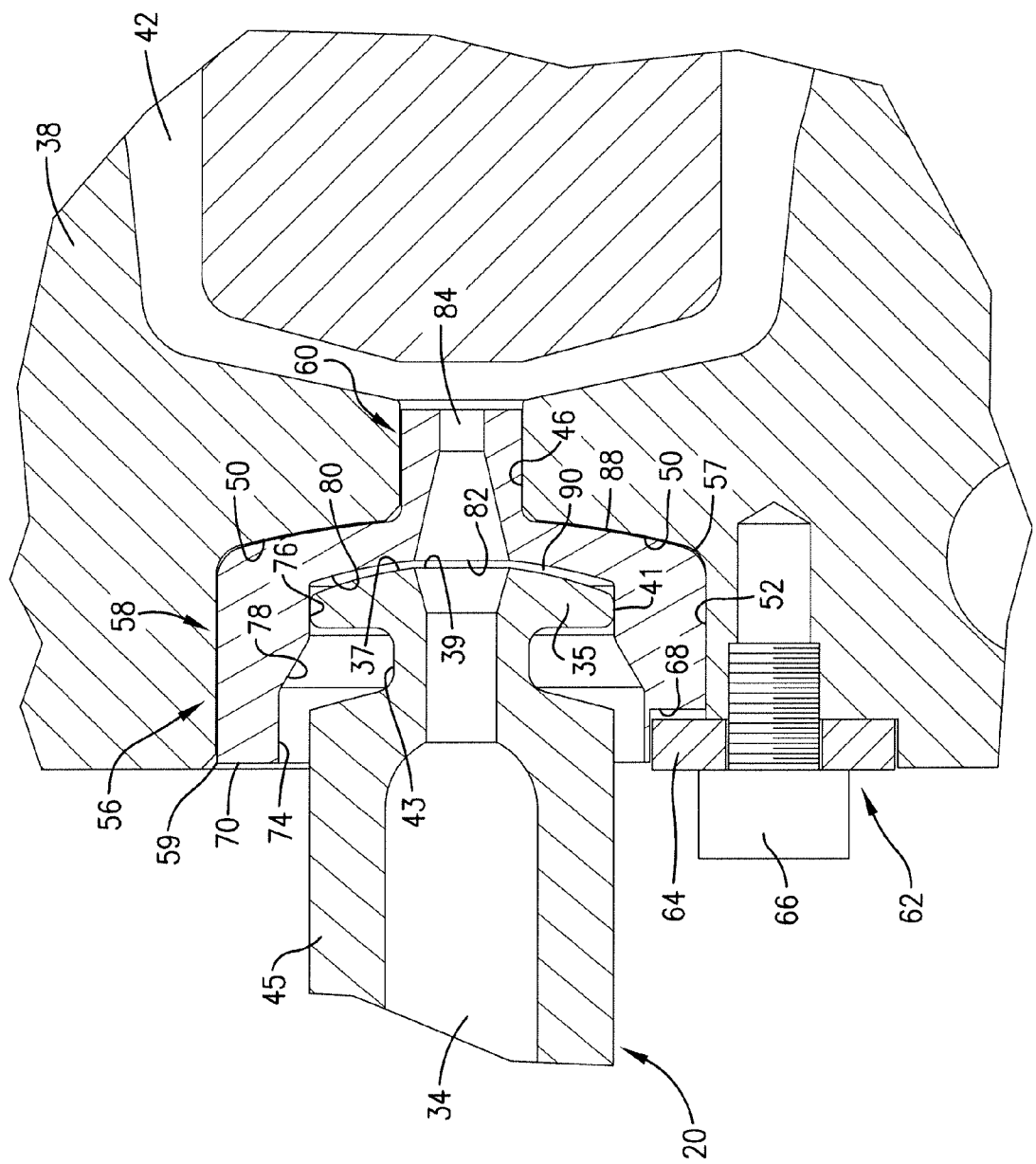
FIG. 15 is a further enlarged view of the subject matter of FIG. 14.

As illustrated particularly in FIGS. 14 and 15, each pair of mold halves 38, 40 also cooperatively defines a gate passage 46 at the manifold end of cavity 42 that is of significantly reduced dimensions relative to cavity 42. Gate passage 46 leads to cavity 42 from an enlarged void or well 48 formed in the manifold side of mold 36 when the latter is closed. Well 48 has a front end wall 50 formed by corresponding end wall surfaces in upper and lower mold halves 38, 40. Well 48 also includes an annular sidewall 52 that is formed by corresponding sidewall surfaces of upper and lower mold halves 38, 40 when mold 36 is closed. The upper and lower sidewall surfaces are substantially identical to one another.

Each lower mold half 40 supports a nozzle-receiving insert cup 56 that occupies the well 48 when the mold 36 is closed. Each insert cup 56 is tubular and hollow, having a relative large diameter, generally cylindrical body portion 58 presenting front and rear ends 57 and 59, respectively. A smaller diameter tip portion 60 projects forwardly from front end 57. Tip portion 60 is cylindrical throughout its length so as to provide a diametrical sealing fit with the surrounding sidewalls of gate passage 46 when mold 38 is closed as illustrated in FIGS. 14 and 15.

Each insert cup 56 is held against rotation within well 48 by its own keeper 62. Each keeper 62 includes a relatively small washer 64 that is secured to lower mold half 40 by a screw 66. A peripheral portion of each washer 64 projects laterally into well 48 and is disposed to be received within a mating notch 68 in a rearwardly facing annular rear edge 70 of rear end 59 of insert cup 56.

Body portion 58 has a nozzle-receiving chamber 72 therein that extends axially inwardly from open rear end 59. Chamber 72 has a relatively large diameter clearance sidewall 74 closest to rear end 59, a relatively smaller diameter locating sidewall 76 closest to front end 57, and a forwardly tapering guiding sidewall 78 intermediate sidewalls 74 and 76. Locating sidewall 76 is disposed at the radially outer extremity of a rearwardly facing front end wall 80 in chamber 72. End wall 80 is generally slightly concave and surrounds a centrally disposed opening 82 that leads to a flow passage 84 through tip 60.

Body portion 58 of insert cup 56 has a cylindrical exterior sidewall 86 that corresponds in configuration with the sidewall 52 of well 48 and is only slightly smaller in diameter than sidewall 52 to adapt insert cup 56 to be snugly received within well 48. Front end 57 of body portion 58 presents a slightly convexly curved front face 88 that matches the curvature of front end wall 50 of well 48 so that front face 88 abuts end wall 50 when insert cup 56 is disposed within well 48.

In one preferred embodiment of the invention, insert cup 56 is constructed from 420 stainless steel, while mold halves 38, 40 are constructed from P20 hardened steel and nozzle 20 is constructed from 4140 hardened steel. In such preferred embodiment, insert cup 56 thus has a lower thermal conductivity than nozzle 20 and mold 36.

Operation

During injection molding operations, nozzles 20 project forwardly into the chambers 72 of insert cups 56 with the front end faces 37 of nozzle tips 35 spaced slightly rearwardly away from front end wall 80 to define a relatively narrow void 90 as shown in FIGS. 14 and 15. The thickness of void 90 may vary, depending upon a number of factors, but will typically range from 0.00 inches to 0.010 inches. Preferably, the radius of curvature of front end wall 80 is greater than that of front end face 37 and has its center point axially offset from the center point of the radius of curvature of end face 37 so that void 90 progressively increases in width as locating sidewall 76 and nozzle tip outer edge 41 are approached. Preferably also, the diameter of locating sidewall 76 is slightly greater than the diameter of nozzle tip 35 at edge 41 such that edge 41 does not seal against locating sidewall 76 but is only confined thereby so as to locate nozzle outlet 39 in axial alignment with gate passage 46.

As hot melt is supplied by manifold block 16 to each nozzle 20, the melt emanates from nozzle tip 35, flows across void 90, moves through passage 84 in insert tip 60, and enters cavity 42. A portion of the melt flow backfills toward the radially outer extremity of void 90 and becomes somewhat cooler than the main flow. This cooler melt solidifies and creates a seal between nozzle tip 35 and insert 56. At the completion of the injection cycle, upper mold half 38 lifts off lower mold half 40 with upper die set member 12, leaving behind insert cup 56 with nozzle 20 received therein. The new parison within cavity 42 on core 44 also remains behind. Core 44, with the parison thereon, is then raised and moved away from the lower mold half 40 to provide room for a new core 44. The new core is inserted into the lower mold half 40 and upper mold half 38 is then lowered into operating position, whereupon the injection cycle is repeated.

As each upper mold half 38 comes down into superimposed relationship with lower mold half 40, upper mold half 38 closes about insert cup 56 without contacting nozzle 20. Thus, while insert cup 56 may become worn over time from repeated engagements with the upper mold half 38, the worn insert cup can be quickly and easily removed and replaced with a new cup. Moreover, gate passage 46 may require less frequent repair than in the past due to the fact that no nozzle tip is directly bearing against and wearing on the surfaces of the gate passage 46 as in prior constructions.

In this respect, it will be appreciated that the relationship between the nozzles 20 and insert cups 56 is such that nozzles 20 can realign and skew to the extent necessary to accommodate dimensional misalignment in the tooling caused by thermal differentials and otherwise. Thus, rather than binding up within the gate passages 46 or damaging such areas when misalignment and thermal conditions would otherwise tend to cause such, nozzle tips 35 simply swivel within locating sidewall 76 as may be necessary. The progressive widening of void 90 provides clearance for front nozzle face 37 to pivot relative to front end wall 80 during this process. Likewise, the enlarged nature of clearance sidewall 74 relative to shank portion 45 of nozzle 20 provides clearance for shank portion 45 during this action. Such realignment is accomplished without in any way restricting the flow of hot melt through the nozzles and into the cavities of mold 36.

It will be appreciated that the swiveling relationship between nozzle tips 35 and insert cups 56 also provides significant time and labor savings during start up and shut down of the machine. In prior constructions, it was typically necessary to pull the nozzles completely back out of the molds prior to start up. With the bolts of the mounting blocks for the nozzles loosened, the manifold block and nozzles were heated up to their operating temperatures and then inserted into the molds, which were also at their operating temperatures. As the nozzles seated themselves within the molds, the loose mounting bolts accommodated slight realignment of the nozzles as necessary for the particular seats involved, whereupon the bolts were retightened to retain the nozzles in such positions. At shut down, the nozzles were withdrawn and allowed to cool separately from the molds in order to prevent bind up or damage within the molds.

With the present invention, however, there is no need for this time-consuming process. Instead, at shut down the nozzles 20 can simply remain fully inserted within their insert cups 56. As various parts of the tooling cool at non-uniform rates causing dimensional variations to arise, nozzles 20 simply swivel as need be at both their base ends 22 and their tip ends 35. At the other extreme, when the operation is started up, nozzles 20 can remain fully inserted within their insert cups 56 as all components of the tooling are brought up to their operating temperatures. Once again, the nozzles 20 can swivel at their opposite ends as need be to accommodate dimensional variations that arise.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. Injection molding apparatus comprising:
   a hot melt distribution block;
   a hot melt discharge nozzle secured to said block,
   said nozzle having a base end configured to permit the nozzle to swivel with respect to the block,
   said nozzle further having a discharge end comprising a nozzle tip;
   a mold having a pair of opposed mold halves that cooperatively define, when the mold is closed, a cavity and a gate passage leading to the cavity,
   at least one of said mold halves being movable away from the other mold half to open the mold along a split line that longitudinally bisects the gate passage and the cavity; and
   a tubular insert mounted on said other mold half and having an insert tip projecting into the gate passage in sealing engagement with sidewalls thereof,
   said insert having a chamber disposed to receive the nozzle for delivery of hot melt from the nozzle tip into the cavity through the insert tip,
   said chamber having an end wall surrounding an opening into said insert tip,
   said chamber further having an axially extending locating sidewall at the radially outer limit of said end wall,
   said nozzle tip having a radially outermost edge confined radially by said locating sidewall of the chamber for locating the nozzle tip in axial alignment with said opening and permitting the nozzle tip to swivel relative to the insert during swivelling of the nozzle relative to the block,
   said nozzle tip having an end face surrounding an outlet in the nozzle tip and disposed to be in opposed relationship to the end wall of the chamber of the insert when the nozzle tip is received within the insert,
   said end face sloping away from said outlet as said outermost edge is approached to render said end face generally convex,
   said end wall of the chamber sloping away from said opening as the locating sidewall is approached to render the end wall generally concave,
   said end face sloping away from said outlet at a faster rate than said end wall slopes away from said opening to provide a clearance void between the end face and the end wall that progressively increases in width as the locating sidewall is approached.

2. Injection molding apparatus as claimed in claim 1,
   said end wall and said end face being curved,
   said end wall having a radius of curvature that is greater than the radius of curvature of said end face.

3. Injection molding apparatus as claimed in claim 2,
   said nozzle having a continuous circumferential groove therein between the nozzle tip and a shank portion of the nozzle.

4. Injection molding apparatus as claimed in claim 3,
   said chamber having a clearance sidewall spaced axially from the locating sidewall in a direction away from said end wall,
   said clearance sidewall being larger in diameter than said locating sidewall to provide clearance between the shank of the nozzle and the insert during swivelling of the nozzle.

5. Injection molding apparatus as claimed in claim 4,
   said chamber further having a tapering sidewall interconnecting the clearance sidewall and the locating sidewall for guiding the nozzle during insertion of the nozzle into the insert.

6. Injection molding apparatus as claimed in claim 1,
   said insert having an annular, rearwardly facing rear edge remote from said insert tip,
   further comprising a retainer on said other mold half engageable with said rear edge of the insert for releasably holding the insert in place.

7. Injection molding apparatus as claimed in claim 6,
said rear edge having a notch therein,
said retainer projecting into said notch.

8. Injection molding apparatus as claimed in claim 1,
said nozzle having a continuous circumferential groove therein between the nozzle tip and a shank portion of the nozzle.

9. Injection molding apparatus as claimed in claim 8,
said chamber having a clearance sidewall spaced axially from the locating sidewall in a direction away from said end wall,
said clearance sidewall being larger in diameter than said locating sidewall to provide clearance between the shank of the nozzle and the insert during swivelling of the nozzle.

10. Injection molding apparatus as claimed in claim 9,
said chamber further having a tapering sidewall interconnecting the clearance sidewall and the locating sidewall for guiding the nozzle during insertion of the nozzle into the insert.

11. Injection molding apparatus as claimed in claim 1,
said chamber having a clearance sidewall spaced axially from the locating sidewall in a direction away from said end wall,
said clearance sidewall being larger in diameter than said locating sidewall to provide clearance between the shank of the nozzle and the insert during swivelling of the nozzle.

12. Injection molding apparatus as claimed in claim 11,
said chamber further having a tapering sidewall interconnecting the clearance sidewall and the locating sidewall for guiding the nozzle during insertion of the nozzle into the insert.

13. Injection molding apparatus comprising:
a hot melt distribution block;
a hot melt discharge nozzle secured to said block,
said nozzle having a base end configured to permit the nozzle to swivel with respect to the block,
said nozzle further having a discharge end comprising a nozzle tip;
a mold having a pair of opposed mold halves that cooperatively define, when the mold is closed, a cavity and a gate passage leading to the cavity,
at least one of said mold halves being movable away from the other mold half to open the mold along a split line that longitudinally bisects the gate passage and the cavity; and
a tubular insert mounted on one of said mold halves and having an insert tip projecting into the gate passage in sealing engagement with sidewalls thereof,
said insert having a chamber disposed to receive the nozzle for delivery of hot melt from the nozzle tip into the cavity through the insert tip,
said chamber having an end wall surrounding an opening into said insert tip,
said chamber further having an axially extending locating sidewall at the radially outer limit of said end wall,
said nozzle tip having an end face and an outer edge,
wherein said end face of the nozzle tip curves away from said end wall of the chamber to present a void between said end wall and said end face.

14. Injection molding apparatus as claimed in claim 13,
said nozzle tip being confined within said chamber via contact of said outer edge of the nozzle tip against said locating sidewall of the chamber,
said nozzle tip permitted to swivel relative to said insert during swivelling of said nozzle relative to said block.

15. Injection molding apparatus as claimed in claim 14,
said chamber having a clearance sidewall spaced axially from the locating sidewall in a direction away from said end wall,
said clearance sidewall being larger in diameter than said locating sidewall to provide clearance between the shank of the nozzle and the insert during swivelling of the nozzle when the nozzle is received within said chamber.

16. Injection molding apparatus as claimed in claim 15,
said chamber further having a tapering sidewall interconnecting the clearance sidewall and the locating sidewall for guiding the nozzle during insertion of the nozzle into the insert.

17. Injection molding apparatus as claimed in claim 13,
wherein the end face of the nozzle tip does not contact the end wall of the chamber.

18. Injection molding apparatus as claimed in claim 13,
wherein said void progressively increases in width as the locating sidewall of said chamber and the outer edge of said nozzle tip are approached.

19. Injection molding apparatus as claimed in claim 13,
said nozzle having a continuous circumferential groove therein between the nozzle tip and a shank portion of the nozzle.

20. Injection molding apparatus as claimed in claim 13,
said mold presenting, when closed, a well,
said well having a front end wall and an annular sidewall,
said tubular insert having a hollowed body presenting said chamber at an inside of said body and an exterior sidewall and an exterior front face at an exterior of said body.

21. Injection molding apparatus as claimed in claim 20,
wherein a configuration of said exterior sidewall of said body of said insert generally corresponds to a configuration of said sidewall of said well,
wherein a configuration of said exterior front face of said body of said insert generally corresponds to a configuration of said front end wall of said well, such that said front face of said insert's body generally abuts said front end wall of the well when said insert is disposed within said well.

22. Injection molding apparatus comprising:
a hot melt distribution block;
a hot melt discharge nozzle secured to said block,
said nozzle having a base end configured to permit the nozzle to swivel with respect to the block,
said nozzle further having a discharge end comprising a nozzle tip;
a mold having a pair of opposed mold halves that cooperatively define, when the mold is closed, a cavity and a gate passage leading to the cavity,
at least one of said mold halves being movable away from the other mold half to open the mold along a split line that longitudinally bisects the gate passage and the cavity; and
a tubular insert mounted on one of said mold halves and having an insert tip projecting into the gate passage in sealing engagement with sidewalls thereof,
said insert having a chamber disposed to receive the nozzle for delivery of hot melt from the nozzle tip into the cavity through the insert tip,
said chamber having an end wall surrounding an opening into said insert tip,
said chamber further having an axially extending locating sidewall at the radially outer limit of said end wall,
said nozzle tip having an end face and an outer edge, wherein said end face of the nozzle tip does not contact said end wall of the chamber.

23. Injection molding apparatus as claimed in claim 22, said nozzle tip being confined within said chamber via contact of said outer edge of the nozzle tip against said locating sidewall of the chamber, said nozzle tip permitted to swivel relative to said insert during swivelling of said nozzle relative to said block.

24. Injection molding apparatus as claimed in claim 23, said chamber having a clearance sidewall spaced axially from the locating sidewall in a direction away from said end wall, said clearance sidewall being larger in diameter than said locating sidewall to provide clearance between a shank of the nozzle and the insert during swivelling of the nozzle when the nozzle is received within said chamber.

25. Injection molding apparatus as claimed in claim 24, said chamber further having a tapering sidewall interconnecting the clearance sidewall and the locating sidewall for guiding the nozzle during insertion of the nozzle into the insert.

26. Injection molding apparatus as claimed in claim 22, wherein said end wall of the chamber and said end face of the nozzle tip are curved, and wherein the radius of curvature of said end wall is greater than the radius of curvature of the end face so as to present a void that progressively increases in width as the locating sidewall of said chamber and the outer edge of said nozzle tip are approached.

\* \* \* \* \*